(12) United States Patent
Teasley

(10) Patent No.: US 8,058,383 B2
(45) Date of Patent: Nov. 15, 2011

(54) ARYLENE-FLUORINATED-SULFONIMIDE IONOMERS AND MEMBRANES FOR FUEL CELLS

(75) Inventor: Mark F. Teasley, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1012 days.

(21) Appl. No.: 11/951,353

(22) Filed: Dec. 6, 2007

(65) Prior Publication Data

US 2011/0218255 A1    Sep. 8, 2011

Related U.S. Application Data

(60) Provisional application No. 60/875,479, filed on Dec. 18, 2006.

(51) Int. Cl.
*C08G 61/02* (2006.01)

(52) U.S. Cl. .......... 528/86; 528/171; 528/373; 429/479; 429/480; 429/498; 429/33; 521/30; 521/27

(58) Field of Classification Search ............... 528/86, 528/171, 373; 429/479, 480, 498, 33; 521/30, 521/27

See application file for complete search history.

(56) References Cited

U.S. PATENT DOCUMENTS

| | | | |
|---|---|---|---|
| 3,664,915 A | 5/1972 | Gore | |
| 3,953,566 A | 4/1976 | Gore | |
| 3,962,153 A | 6/1976 | Gore | |
| 4,187,390 A | 2/1980 | Gore | |
| 5,403,675 A | 4/1995 | Ogata et al. | |
| 5,463,005 A | 10/1995 | Desmarteau | |
| 5,547,551 A | 8/1996 | Bahar et al. | |
| 5,962,631 A | 10/1999 | Woo et al. | |
| 6,110,333 A | 8/2000 | Spethmann et al. | |
| 6,353,072 B1 | 3/2002 | Towns et al. | |
| 7,135,537 B2 | 11/2006 | Hoffman | |
| 2004/0225153 A1 | 11/2004 | Allcock et al. | |
| 2005/0031925 A1 | 2/2005 | Ofer et al. | |
| 2005/0239994 A1 | 10/2005 | Litt et al. | |

FOREIGN PATENT DOCUMENTS

| | | |
|---|---|---|
| CA | 2 599 646 A1 | 9/2006 |
| JP | 2005314452 A | 11/2005 |
| WO | 00/53656 A1 | 9/2000 |
| WO | 2007102235 A1 | 9/2007 |

OTHER PUBLICATIONS

Database CA [Online] Chemical Abstracts Service, Columbus, Ohio, US; Nov. 11, 2005, Yoshimura, Ken: "Polyarylenes with good proton conductivity" XP002493434.
Database CA [Online] Chemical Abstracts Service Columbus, Ohio, US; Sep. 13, 2007, Hida, Noriyuki et al: "sulfonyl-containing dihalophenyl compounds for polyarylenes" XP002493433.
International Search Report, Aug. 2008.
D. D. Desmarteau, J. Fluorine Chem, 1995, pp. 203, vol. 72.
Yamamoto, Progress in Polymer Science, 1992, p. 1153, vol. 17.
Ioyda et al., "Homocoupling of Aryl Halides Using Nickel(II) complex and Zinc in the Presence of Et4NI. An Efficient Method for the Synthesis of Biaryls and Bipyridines", Bulletin of Chemical Society of Japan, 1990, pp. 80-87, vol. 63.
Colon et al., Journal of Polymer Science, Part A, Polymer Chemistry Edition, 1990, p. 367, vol. 28.
Y. Sone et al., "Proton Conductivity of Nation® 117 As Measured by a Four-Electrode AC Impedance Method", J. Electrochem. Soc., 1996, p. 1254, vol. 143.
Vogel's Textbook of Practical Organic Chemistry, 4th Edition, Longman (London), 1981, pp. 285-286 (Book Not Included).
C. Courtot and C. C. Lin, Bull. Soc. Chim. Fr., 1931, p. 1047, vol. 49 (4).
Miyaura et al., Synthetic Communications, 1981, p. 513, vol. 11.
Wallow et al., American Chemical Society, Polymer Preprint, 1993, p. 1009, vol. 34, (1).

*Primary Examiner* — Randy Gulakowski
*Assistant Examiner* — Shane Fang

(57) ABSTRACT

The preparation of aromatic sulfonimide polymers useful as membranes in electrochemical cells is described.

11 Claims, No Drawings

ARYLENE-FLUORINATED-SULFONIMIDE IONOMERS AND MEMBRANES FOR FUEL CELLS

Described herein is the preparation of aromatic sulfonimide polymers useful as membranes in electrochemical cells. This invention was made with government support under Contract No. DE-FC04-02AL67606 awarded by the U.S. Department of Energy. The government has certain rights in the invention.

FIELD OF INVENTION

Background

Polymer electrolyte membrane fuel cells (PEMFC) are expected to provide higher efficiencies, fewer environmental pollutants, and reduced operating and maintenance costs than traditional power sources. An important component of a PEMFC is a polymer electrolyte membrane (PEM). The range of potential candidates for use as membrane materials in PEMFCs is limited by a number of requirements, including chemical, thermal, and mechanical stability, high ionic conductivity, and low reactant permeability. Developments have been made in the use of sulfonic acid functionalized polymers, including membranes such as Nafion® perfluorosulfonic acid membranes.

Known membranes made from sulfonic acid functionalized polymers have been found to have inadequate performance at temperatures greater than 100° C. due, in part, to the dependence of the membranes on water for proton conduction. Above 100° C., pressure constraints limit the amount of water that can be used to hydrate a membrane. At relatively low levels of humidity, insufficient water is present within the membrane to support the transport of protons. In addition to improved performance at higher temperatures, it is also desirable to have improved mechanical stability at such temperatures.

Many different approaches have been taken to solve this problem including introducing multiple or different ionic groups than sulfonic acids, such as disulfonic acids, perfluorosulfonimides, disulfonimides, or methides, which succeed in lowering equivalent weight. Many different sulfonated aromatic polymer compositions have been developed to improve membrane properties by sulfonating non-sulfonated polymers with desired properties. However, due to relatively poor control inherent in the process, post-polymerization sulfonation can result in sulfonation on the most electron-rich aromatic rings, essentially those substituted with just the ether functional groups, which are also the most activated to a subsequent thermal decomposition of the sulfonic acid groups.

Most of these ionomers have used flexible polymer backbones. A different approach has been to use rigid-rod polymers to attach the ionomeric groups. This approach can enable the preparation of low equivalent weight polymers, which can also lead to the disadvantage of the polymers being water-soluble.

Rigid-rod systems can be rendered insoluble by several methods. Arylene polymer backbones have been used for the rigid-rod backbone, and they have been typically substituted with sulfonic acid groups as the ionomeric group. Consequently, they are aryl sulfonic acids, which are known to be less acidic and conductive than fluorosulfonic acids.

Polyarylene ionomers containing fluorosulfonimides as the ionomeric group are more acidic than aromatic sulfonic acids, leading to improved conductivity. However, they are more difficult to prepare.

M. Hofmann (U.S. Pat. No. 7,135,537) prepared aromatic polymers containing fluorosulfonimide functionalities in a flexible backbone. However, all the polymers prepared also contained an ether functionality in the aromatic backbone, which decreases their stability. The higher acid strength of the fluorosulfonimide groups leads to thermal and chemical instability in the ether groups relative to comparable sulfonated aromatic polymers, and the flexibility of the ether groups increases the potential for excessive water uptake, which reduces their mechanical stability. In addition, electron-rich aromatic rings substituted with ether groups are more susceptible to chemical degradation under the oxidative conditions inherent in PEMFC, which are due, in part, to high permeability to the fuel cell reactants.

Litt et al. (U.S. Patent Application 2005/023994) prepared poly(phenylenesulfonic acid) via an Ullmann coupling reaction using Cu as the catalyst. However, the resulting polymer contains aromatic sulfonic acid groups and this type of coupling reaction will not work with fluorosulfonimide substituents.

Applicants have discovered a method to prepare fluorosulfonimide substituted rigid-rod backbone polymers with no ether or other flexible functionality in the backbone.

SUMMARY

Disclosed is a polymer comprising repeating units of Formula (I):

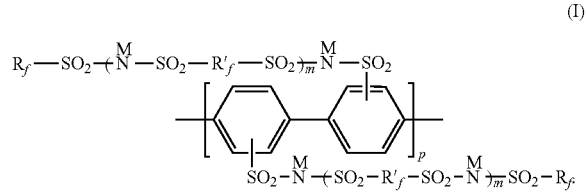

wherein $R_f$ and $R'_f$ are independently a straight chain, branched or cyclic, perfluorinated alkylene groups having from 1 to 20 carbon atoms and optionally substituted with one or more ether oxygens or halogens; m is 0 to 6; and M is one or more of monovalent cation.

Also disclosed is a membrane and an electrochemical cell made from the polymer. The electrochemical cell can be a fuel cell.

DETAILED DESCRIPTION

Disclosed herein are polymers that are useful as cation-exchange resins. The cation-exchange resins are useful in making proton-exchange membranes for electrochemical cells such as fuel cells and can be used in any application wherein cation-exchange capacity is desired. The resins may also be used as electrolytes, electrode binders, in lithium batteries in lithium salt form, and in any application requiring charge-transfer phenomena, such as components of light-emitting displays. The polymers described herein can be either homopolymers or copolymers.

Described herein is a polymer comprising repeating units of Formula (I):

(I)

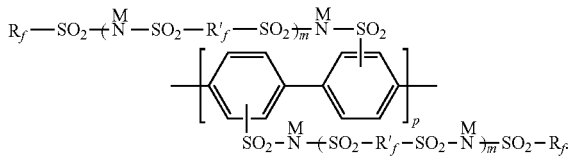

wherein $R_f$ and $R'_f$ are independently a straight chain, branched or cyclic, perfluorinated alkylene group having from 1 to 20 carbon atoms and optionally substituted with one or more ether oxygens or halogens; m is 0 to 6; and M is one or more of monovalent cation.

The term "copolymer" is intended to include oligomers and copolymers having two or more different repeating units. A copolymer having repeating units derived from a first monomer "X-A-X" and a second monomer "X-B-X" will have repeating units (-A-) and (-B-). The copolymers described herein can be random or block copolymers.

The practical upper limit to the number of monomeric units in the polymer is determined in part by the desired solubility of a polymer in a particular solvent or class of solvents. As the total number of monomeric units increases, the molecular weight of the polymer increases. The increase in molecular weight is generally expected to result in a reduced solubility of the polymer in a particular solvent. Moreover, in one embodiment, the number of monomeric units at which a polymer becomes substantially insoluble in a given solvent is dependent in part upon the structure of the monomer. In one embodiment, the number of monomeric units at which a copolymer becomes substantially insoluble in a given solvent is dependent in part upon the ratio of the comonomers. For example, a polymer composed of flexible monomers may become substantially insoluble in an organic solvent if the resulting polymer becomes too rigid in the course of polymerization. As another example, a copolymer composed of several monomers may become substantially insoluble in an organic solvent when ratio of rigid monomeric units to flexible monomeric units is too large. The selection of polymer molecular weight, polymer and copolymer composition, and a solvent is within the purview of one skilled in the art.

The monovalent cation M can be a single cation or a mixture of different cations. In one embodiment, the M is K, Na, Li, or H. In another embodiment, m is 0.

The sulfonimide substituent is attached at any open valence of the ring as indicated.

By "perfluorinated alkylene" it is meant a divalent group containing carbon and fluorine connected by single bonds, optionally substituted with ether oxygens or other halogens, and containing two free valences to different carbon atoms. It can be linear, branched, or cyclic. In one embodiment $R_f$ and $R'_f$ are independently (that is, can be the same or different) a perfluorinated alkylene groups having from 1 to 10 carbon atoms. In another embodiment, $R_f$ and $R'_f$ are independently a linear, perfluorinated alkylene groups having from 1 to 4 carbon atoms.

In one embodiment the polymers of Formula (I) are of the structure:

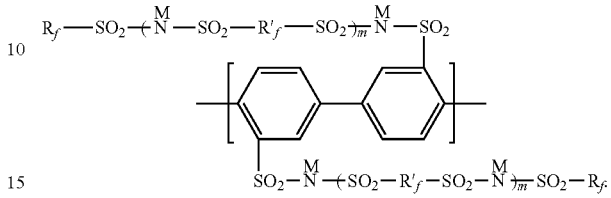

The polymers and copolymers as described herein can be prepared using any known method in the art, and the reactants used to prepare the composition of Formula (I) may be obtained commercially or be prepared using any known method in the art or those described herein. One suitable method utilizes monomers of the general structure shown in Formula (II):

(II)

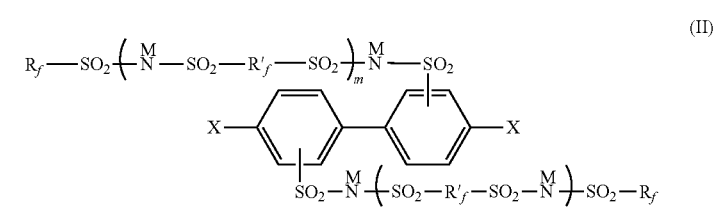

in which X are leaving groups that participate in carbon-carbon bond-forming reactions such as but not limited to chlorine, bromine, iodine, methanesulfonate, trifluoromethanesulfonate, boronic acid, boronate salts, boronic acid esters, and boranes. A suitable synthetic route is one in which the leaving groups are eliminated in carbon-carbon bond-forming reactions that are catalyzed by zerovalent transition compounds, described further below. The selection of the proper leaving groups is dictated by the choice of the specific zerovalent transition metal compound.

These monomers, and the reactants used to prepare them, may be obtained commercially or be prepared using any known method in the art or those described herein.

In one method, a benzene-sulfonyl chloride substituted with two leaving groups as defined above is reacted with a substituted sulfonamide then coupled together to give a biphenylene monomer substituted with two leaving groups that is suitable for polymerization, as outlined below:

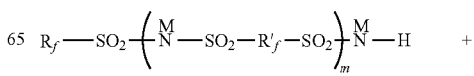 +

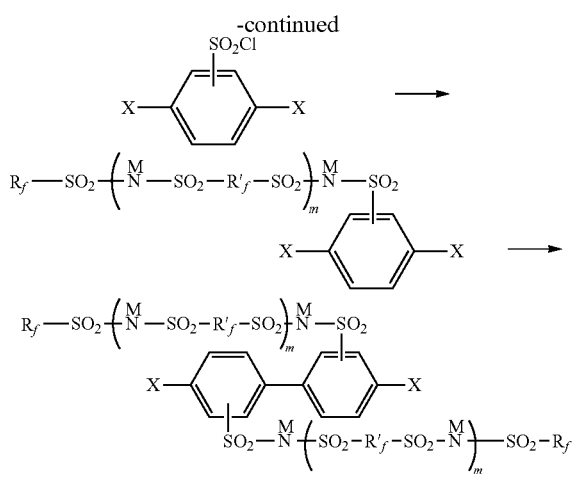

The sulfonamides and the benzene-sulfonyl chlorides can be obtained commercially or prepared by any means known in the art. Sulfonamides where m is 0 can be prepared by the reaction of ammonia with perfluoroalkylsulfonyl fluorides. Sulfonamides where m is greater than 0 can be prepared by modifying the procedures of D. D. DesMarteau, J. Fluorine Chem. 72 (1995) pp. 207-208, and U.S. Pat. No. 5,463,005, Example 5, to obtain sulfonimide oligomers with a single sulfonamide end group.

The polymerizations as described herein can generally be performed by synthetic routes in which the leaving groups of the monomers are eliminated in carbon-carbon bond-forming reactions. Such carbon-carbon bond-forming reactions are typically mediated by a zerovalent transition metal compound that contains neutral ligands. In one embodiment, the zerovalent transition metal compound contains nickel or palladium.

The monomers of Formula (II) may also be reacted to form larger monomeric units that are then polymerized alone or with other monomers to form the polymers disclosed herein. For example, a copolymer $(-A-)_x(-B-)_y$ may be formed by copolymerizing monomer X-A-X with monomer X-B-X, or by forming larger monomer X-A-B-X and polymerizing that monomer. In both cases, the resulting polymer is considered a copolymer derived from monomer X-A-X and monomer X-B-X.

Neutral ligands are defined as ligands that are neutral, with respect to charge, when formally removed from the metal in their closed shell electronic state. Neutral ligands contain at least one lone pair of electrons, a pi-bond, or a sigma bond that is capable of binding to the transition metal. For the processes described herein, the neutral ligand may also be a combination of two or more neutral ligands. Neutral ligands may also be polydentate when more than one neutral ligand is connected via a bond or a hydrocarbyl, substituted hydrocarbyl or a functional group tether. A neutral ligand may be a substituent of another metal complex, either the same or different, such that multiple complexes are bound together. Neutral ligands can include carbonyls, thiocarbonyls, carbenes, carbynes, allyls, alkenes, olefins, cyanides, nitriles, carbon monoxide, phosphorus containing compounds such as phosphides, phosphines, or phosphites, acetonitrile, tetrahydrofuran, tertiary amines (including heterocyclic amines), ethers, esters, phosphates, phosphine oxides, and amine oxides.

Three synthetic methods based on zerovalent transition metal compounds that can be used to prepare the polymers are described herein. In each method, the zerovalent transition metal compound that is the active species in carbon-carbon bond formation can be introduced directly into the reaction, or can be generated in situ under the reaction conditions from a precursor transition metal compound and one or more neutral ligands.

In a first synthetic method, as described in Yamamoto, Progress in Polymer Science, Vol. 17, p 1153 (1992), the dihalo derivatives of the monomers are reacted with stoichiometric amounts of a zerovalent nickel compound, such as a coordination compound like bis(1,5-cyclooctadiene)nickel (0), and a neutral ligand, such as triphenylphosphine or 2,2'-bipyridine. These components react to generate the zerovalent nickel compound that is the active species in the polymerization reaction. A second neutral ligand, such as 1,5-cyclooctadiene, can be used to stabilize the active zerovalent nickel compound.

In a second synthetic method, as described in U.S. Pat. No. 5,962,631, Ioyda et al., Bulletin of the Chemical Society of Japan, Vol. 63, p. 80 (1990), and Colon et al., Journal of Polymer Science, Part A, Polymer Chemistry Edition, Vol. 28, p. 367 (1990), the dihalo derivatives of the monomers are reacted with catalytic amounts of a divalent nickel compound in the presence of one or more neutral ligands in the presence of stoichiometric amounts of a material capable of reducing the divalent nickel ion to zerovalent nickel.

The catalyst is formed from a divalent nickel salt. The nickel salt may be any nickel salt that can be converted to the zerovalent state under reaction conditions. Suitable nickel salts are the nickel halides, typically nickel dichloride or nickel dibromide, or coordination compounds, typically bis(triphenylphosphine)nickel dichloride or (2,2'-bipyridine) nickel dichloride. The divalent nickel salt is typically present in an amount of about 0.01 mole percent or greater, more typically about 0.1 mole percent or greater or 1.0 mole percent or greater. The amount of divalent nickel salt present is typically about 30 mole percent or less, more typically about 15 mole percent or less based on the amount of monomers present.

The polymerization is performed in the presence of a material capable of reducing the divalent nickel ion to the zerovalent state. Suitable material includes any metal that is more easily oxidized than nickel. Suitable metals include zinc, magnesium, calcium and lithium, with zinc in the powder form being typical. At least stoichiometric amounts of reducing agent based on the monomers are required to maintain the nickel species in the zerovalent state throughout the reaction. Typically, about 150 mole percent or greater, more typically about 200 mole percent or greater, or about 250 mole percent or greater is used. The reducing agent is typically present in an amount of about 500 mole percent or less, about 400 mole percent or less, or about 300 mole percent or less based on the amount of monomer.

Also present are one or more compounds capable of acting as a ligand. Suitable ligands are neutral ligands as described above, and include trihydrocarbylphosphines. Typical ligands are monodentate, such as triaryl or trialkylphosphines like triphenylphosphine, or bidentate, such as 2,2'-bipyridine. A compound capable of acting as a monodentate ligand is typically present in an amount of from about 10 mole percent or greater, or about 20 mole percent or greater based on the monomer. A compound capable of acting as a monodentate ligand is typically present in an amount of about 100 mole percent or less, about 50 mole percent or less, or about 40 mole percent or less. A compound capable of acting as a bidentate ligand is typically present in an amount that is about a molar equivalent or greater based on the divalent nickel salt.

Alternatively, the bidentate ligand can be incorporated into the nickel salt as a coordination compound as described above.

In a third synthetic method, as described in PCT application WO 00/53656 and U.S. Pat. No. 6,353,072, a dihalo derivative of one monomer is reacted with a derivative of another monomer having two leaving groups selected from boronic acid (—B(OH$_2$) or boronate salt, boronic acid esters (—BOR$_2$) or (—B(ORO)), and boranes (—BR$_2$), where R is generally a hydrocarbyl group, in the presence of a catalytic amount of a zerovalent palladium compound containing a neutral ligand as described above, such as tetrakis(triphenylphosphine)palladium(0). If the leaving group is a boronic ester or borane group, the reaction mixture should include sufficient water or an organic base to hydrolyze the boronic ester or borane group to the corresponding boronic acid group. The diboronic derivative of a monomer can be prepared from the dihalo derivative by known methods, such as those described in Miyaura et al., Synthetic Communication, Vol. 11, p. 513 (1981) and Wallow et al., American Chemical Society, Polymer Preprint, Vol. 34, (1), p. 1009 (1993).

All of the synthetic methods discussed herein can be performed in the presence of a compound capable of accelerating the reaction. Suitable accelerators include alkali metal halides such as sodium bromide, potassium bromide, sodium iodide, tetraethylammonium iodide, and potassium iodide. The accelerator is used in a sufficient amount to accelerate the reaction, typically 10 mole percent to 100 mole percent based on the monomer.

The reactions are typically run in a suitable solvent or mixture of solvents, that is a solvent that is not detrimental to catalyst, reactant and product, and preferably one is which the reactants and products are soluble. Suitable solvents include N,N-dimethylformamide (DMF), toluene, tetrahydrofuran (THF), acetone, anisole, acetonitrile, N,N-dimethylacetamide (DMAc), and N-methylpyrrolidinone (NMP). The amount of solvent used in this process can vary over a wide range. Generally, it is desired to use as little solvent as possible. The reactions are typically conducted in the absence of oxygen and moisture, as the presence of oxygen can be detrimental to the catalyst and the presence of a significant amount of water could lead to premature termination of the process. More typically, the reaction is performed under an inert atmosphere such as nitrogen or argon.

The reactions can be performed at any temperature at which the reaction proceeds at a reasonable rate and does not lead to degradation of the product or catalyst. Generally, the reaction is performed at a temperature of about 20° C. to about 200° C., more typically less than 100° C. The reaction time is dependent upon the reaction temperature, the amount of catalyst and the concentration of the reactants, and is usually about 1 hour to about 100 hours.

The polymers prepared by the disclosed methods can be recovered according to conventional techniques including filtration and precipitation using a non-solvent. They also can be dissolved or dispersed in a suitable solvent for further processing.

The polymers described herein can be formed into membranes using any conventional method such as but not limited to solution or dispersion film casting or extrusion techniques. The membrane thickness can be varied as desired for a particular application. Typically, for electrochemical uses, the membrane thickness is less than about 350 µm, more typically in the range of about 25 µm to about 175 µm. If desired, the membrane can be a laminate of two polymers such as two polymers having different equivalent weight. Such films can be made by laminating two membranes. Alternatively, one or both of the laminate components can be cast from solution or dispersion. When the membrane is a laminate, the chemical identities of the monomer units in the additional polymer can independently be the same as or different from the identities of the analogous monomer units of the first polymer. One of ordinary skill in the art will understand that membranes prepared from the dispersions may have utility in packaging, in non-electrochemical membrane applications, as an adhesive or other functional layer in a multi-layer film or sheet structure, and other classic applications for polymer films and sheets that are outside the field of electrochemistry. For the purposes of the present invention, the term "membrane", a term of art in common use in electrochemistry, is synonymous with the terms "film" or "sheet", which are terms of art in more general usage, but refer to the same articles.

The membrane may optionally include a porous support or reinforcement for the purposes of improving mechanical properties, for decreasing cost and/or other reasons. The porous support may be made from a wide range of materials, such as but not limited to non-woven or woven fabrics, using various weaves such as the plain weave, basket weave, leno weave, or others. The porous support may be made from glass, hydrocarbon polymers such as polyolefins, (e.g., polyethylene, polypropylene, polybutylene, and copolymers), and perhalogenated polymers such as polychlorotrifluoroethylene. Porous inorganic or ceramic materials may also be used. For resistance to thermal and chemical degradation, the support typically is made from a fluoropolymer, more typically a perfluoropolymer. For example, the perfluoropolymer of the porous support can be a microporous film of polytetrafluoroethylene (PTFE) or a copolymer of tetrafluoroethylene. Microporous PTFE films and sheeting are known that are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids. Impregnation of expanded PTFE (ePTFE) with perfluorinated sulfonic acid polymer is disclosed in U.S. Pat. Nos. 5,547,551 and 6,110,333. ePTFE is available under the trade name "Goretex" from W. L. Gore and Associates, Inc., Elkton, Md., and under the trade name "Tetratex" from Donaldson Company, Inc., Bloomington, Minn.

Membrane electrode assemblies (MEA) and fuel cells therefrom are well known in the art and can comprise any of the membranes described above. One suitable embodiment is described herein. An ionomeric polymer membrane is used to form a MEA by combining it with a catalyst layer, comprising a catalyst such as platinum, which is unsupported or supported on carbon particles, a binder such as Nafion®, and a gas diffusion backing. The catalyst layers may be made from well-known electrically conductive, catalytically active particles or materials and may be made by methods well known in the art. The catalyst layer may be formed as a film of a polymer that serves as a binder for the catalyst particles. The binder polymer can be a hydrophobic polymer, a hydrophilic polymer, or a mixture of such polymers. The binder polymer is typically ionomeric and can be the same ionomer as in the membrane. A fuel cell is constructed from a single MEA or multiple MEAs stacked in series by further providing porous and electrically conductive anode and cathode gas diffusion backings, gaskets for sealing the edge of the MEA(s), which also provide an electrically insulating layer, graphite current collector blocks with flow fields for gas distribution, aluminum end blocks with tie rods to hold the fuel cell together, an anode inlet and outlet for fuel such as hydrogen, and a cathode gas inlet and outlet for oxidant such as air.

EXAMPLES

Through-Plane Conductivity Measurement

The through-plane conductivity of a membrane was measured by a technique in which the current flowed perpendicular to the plane of the membrane. The lower electrode was formed from a 12.7 mm diameter stainless steel rod and the upper electrode was formed from a 6.35 mm diameter stainless steel rod. The rods were cut to length, machined with grooves to accept "O"-ring seals, and their ends were polished and plated with gold. The lower electrode had six grooves (0.68 mm wide and 0.68 mm deep) to allow humidified air flow. A stack was formed consisting of lower electrode/GDE/membrane/GDE/upper electrode. The GDE (gas diffusion electrode) was a catalyzed ELAT® (E-TEK Division, De Nora North America, Inc., Somerset, N.J.) comprising a carbon cloth with microporous layer, platinum catalyst, and 0.6-0.8 mg/cm$^2$ Nafion® application over the catalyst layer. The lower GDE was punched out as a 9.5 mm diameter disk, while the membrane and the upper GDE were punched out as 6.35 mm diameter disks to match the upper electrode. The stack was assembled and held in place within a 46.0×21.0 mm×15.5 mm block of annealed glass-fiber reinforced machinable PEEK that had a 12.7 mm diameter hole drilled into the bottom of the block to accept the lower electrode and a concentric 6.4 mm diameter hole drilled into the top of the block to accept the upper electrode. The PEEK block also had straight threaded connections. Male connectors with SAE straight thread and tubing to "O"-ring seals (1M1SC2 and 2 M1SC2 from Parker Instruments) were used to connect to the variable humidified air feed and discharge. The fixture was placed into a small vice with rubber grips and 10 lb-in of torque was applied using a torque wrench. The fixture containing the membrane was connected to 1/16" tubing (humidified air feed) and 1/8" tubing (humidified air discharge) inside a thermostated forced-convection oven for heating. The temperature within the vessel was measured by means of a thermocouple.

Water was fed from an Isco Model 500D syringe pump with pump controller. Dry air was fed (200 sccm standard) from a calibrated mass flow controller (Porter F201 with a Tylan® RO-28 controller box). To ensure water evaporation, the air and the water feeds were mixed and circulated through a 1.6 mm (1/16"), 1.25 m long piece of stainless steel tubing inside the oven. The resulting humidified air was fed into the 1/16" tubing inlet. The cell pressure (atmospheric) was measured with a Druck® PDCR 4010 Pressure Transducer with a DPI 280 Digital Pressure Indicator. The relative humidity was calculated assuming ideal gas behavior using tables of the vapor pressure of liquid water as a function of temperature, the gas composition from the two flow rates, the vessel temperature, and the cell pressure. The grooves in the lower electrode allowed flow of humidified air to the membrane for rapid equilibration with water vapor. The real part of the AC impedance of the fixture containing the membrane, $R_s$, was measured at a frequency of 100 kHz using a Solartron SI 1260 Impedance/Gain Phase Analyzer and SI 1287 Electrochemical Interphase with ZView 2 and ZPlot 2 software (Solartron Analytical, Farnborough, Hampshire, GU14 0NR, UK). The fixture short, $R_f$, was also determined by measuring the real part of the AC impedance at 100 kHz for the fixture and stack assembled without a membrane sample. The conductivity, $\kappa$, of the membrane was then calculated as $$\kappa = t/((R_s - R_f) * 0.317 \text{cm}^2),$$

where t was the thickness of the membrane in cm.

In-Plane Conductivity Measurement

The in-plane conductivity of a membrane was measured under conditions of controlled relative humidity and temperature by a technique in which the current flowed parallel to the plane of the membrane. A four-electrode technique was used similar to that described in an article entitled "Proton Conductivity of Nafion® 117 As Measured by a Four-Electrode AC Impedance Method" by Y. Sone et al., J. Electrochem. Soc., vol. 143, pg. 1254 (1996), which is herein incorporated by reference. A lower fixture was machined from annealed glass-fiber reinforced PEEK to have four parallel ridges containing grooves that supported and held four 0.25 mm diameter platinum wire electrodes, and slots that allowed for circulation of humidified air. The distance between the two outer electrodes was 25 mm, while the distance between the two inner electrodes was 10 mm. A strip of membrane was cut to a width between 10 and 16 mm and a length sufficient to cover and extend slightly beyond the outer electrodes, and placed on top of the platinum electrodes. An upper fixture which had ridges corresponding in position to those of the bottom fixture, was placed on top and the two fixtures were clamped together so as to push the membrane into contact with the platinum electrodes. The fixture containing the membrane was placed inside a small pressure vessel (pressure filter housing), which was placed inside a thermostated forced-convection oven for heating. The temperature within the vessel was measured by means of a thermocouple.

Water was fed from an Isco Model 500D syringe pump with pump controller. Dry air was fed (200 sccm standard) from a calibrated mass flow controller (Porter F201 with a Tylan® RO-28 controller box). To ensure water evaporation, the air and the water feeds were mixed and circulated through a 1.6 mm (1/16"), 1.25 m long piece of stainless steel tubing inside the oven. The resulting humidified air was fed into the inlet of the pressure vessel. The total pressure within the vessel (100 to 345 kPa) was adjusted by means of a GO BP-3 series back-pressure regulator. The cell pressure was measured with a Druck® PDCR 4010 Pressure Transducer with a DPI 280 Digital Pressure Indicator. The relative humidity was calculated assuming ideal gas behavior using tables of the vapor pressure of liquid water as a function of temperature, the gas composition from the two flow rates, the vessel temperature, and the total pressure. The slots in the lower and upper parts of the fixture allowed for circulation of humidified air to the membrane for rapid equilibration with water vapor. Current was applied between the outer two electrodes while the resultant voltage was measured between the inner two electrodes. The real part of the AC impedance (resistance) between the inner two electrodes, R, was measured at a frequency of 1000 Hz using a Solartron SI 1260 Impedance/Gain Phase Analyzer and SI 1287 Electrochemical Interphase with ZView 2 and ZPlot 2 software (Solartron Analytical, Farnborough, Hampshire, GU14 0NR, UK). The conductivity, $\kappa$, of the membrane was then calculated as $$\kappa = 1.00 \text{cm}/(R * t * w),$$

where t was the thickness of the membrane and w was its width (both in cm).

Example 1

Inside a glove box, a 200 mL round-bottom flask equipped with a reflux condenser, stirring bar, and septum was charged with 2,5-dibromo-benzene-sulfonyl chloride (16.72 g, 50 mmoles), trifluoromethanesulfonamide (7.45 g, 50 mmoles), and acetonitrile (50 mL). Triethylamine (14 mL, 100 mmoles) was added slowly by syringe. The solution was heated to a reflux overnight. The solution was cooled to room temperature and poured into an aqueous solution of sodium hydroxide (4.0 g, 100 mmoles) in 100 mL water. The solvents were evaporated on a rotary evaporator and the solids were dried under vacuum. The solids were dissolved in n-propanol at reflux, treated with decolorizing carbon, filtered to remove the carbon and residual salts, evaporated on a rotary evaporator, and dried under vacuum to give 23.54 g (100%). The solids were recrystallized from dioxane to give 12.77 g (54% yield) of N-trifluoromethanesulfonyl-2,5-dibromo-benzene-sulfonamide, sodium salt. The salt was dried overnight in a vacuum oven at 150° C. under a nitrogen purge. $^1$H NMR (DMSO-d$_6$): 7.62 (dd, J=8 and 2 Hz, 1H), 7.69 (d, J=8 Hz, 1H), 8.05 (d, J=2 Hz, 1H).

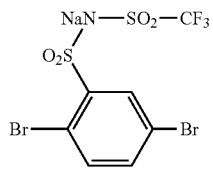

Activation of Copper Powder

Copper powder was activated according to the procedure in Vogel's Textbook of Practical Organic Chemistry, 4$^{th}$ Edition, 1981, Longman (London), page 285-286. Copper bronze (50 g, Aldrich Chemical Company, Milwaukee, Wis.) was stirred for 10-20 minutes with a solution of iodine (10 g) dissolved in acetone (500 mL) to give a gray mixture. The copper was filtered off, washed acetone, and added to a solution of hydrochloric acid (150 mL) and acetone (150 mL). The mixture was stirred until the gray solids dissolved then the copper was filtered off and washed well with acetone. The activated copper solids were dried under high vacuum and transferred to a glove box for storage and handling.

Example 2

Inside a glove box, a 200 mL round-bottom flask equipped with a stirring bar, reflux condenser, and a septum was charged with N-trifluoromethanesulfonyl-2,5-dibromo-benzene-sulfonamide, sodium salt (11.24 g, 24 mmoles), activated copper powder (23.5 g), and DMF (50 mL). The flask was heated to 120° C. under nitrogen and stirred overnight. The solution was cooled to room temperature, filtered, and the solids washed with DMF. The solvent was evaporated by distilling under high vacuum and the resulting solids were dried under vacuum. The solids were dissolved in water by adding hydrochloric acid to give a pH of 2-3. Residual dark solids were filtered off then the solution was heated to a reflux, treated with sodium chloride (30 g), and concentrated to 125 mL to induce precipitation. The mixture was cooled to room temperature to give colored solids. Ammonium hydroxide was added to give a dark blue solution, which removed most of the color from the solids. The solids were collected by vacuum filtration, washed with ether, and dried under vacuum to give 9.02 g (97% crude yield). The solids were dissolved in n-propanol at a reflux, treated with decolorizing carbon, filtered, evaporated, and dried under vacuum. The solids were recrystallized twice from dioxane, dried in a vacuum oven at 150° C. under nitrogen purge, and transferred to a glove box for storage and handling to give 4.195 g (45% yield) of N,N'-bis(trifluoromethanesulfonyl)-4,4'-dibromo-biphenyl-2,2'-disulfonamide, disodium salt. $^1$H NMR (DMSO-d$_6$): 7.26 (d, J=8.2 Hz, 2H), 7.62 (dd, J=8.2 and 2.2 Hz, 2H), 8.03 (d, J=2.2 Hz, 2H).

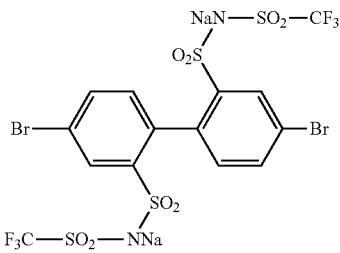

Example 3

Inside the glove box, a 100 mL round-bottom flask equipped with a stirring bar and a septum was charged with bis(1,5-cyclooctadiene)nickel(0) (2.89 g, 10.5 mmoles), cyclooctadiene (1.14 g, 10.5 mmoles), 2,2'-dipyridyl (1.64 g, 10.5 mmoles), and DMF (20 mL). The flask was heated to 60° C. under nitrogen for 30 minutes to give a dark violet-colored solution. Inside the glove box, a 50 mL round-bottom flask equipped with a septum was charged with N,N'-bis(trifluoromethanesulfonyl)-4,4'-dibromo-biphenyl-2,2'-disulfonamide, disodium salt (4.05 g, 5.2 mmoles) and DMF (20 mL). This solution was added by cannula to the reaction flask under nitrogen and maintained at 60° C. for two days to give a blue-black colored mixture. The temperature was raised to 80° C. overnight to give a black mixture with an increase in viscosity. The reaction mixture was poured into a 1:1 solution of hydrochloric acid and methanol to precipitate the solid polymer. The mixture was chopped in a blender to disperse the polymer into particles. The polymer was collected by vacuum filtration and briefly air dried. The polymer was dissolved in DMF, filtered, reprecipitated using hydrochloric acid, and collected by vacuum filtration. The polymer was dried in a vacuum oven at 70° C. under nitrogen purge to give 2.05 g (69% yield) of poly(p-phenylene trifluoromethanesulfonimide). $\eta_{inh}$ (0.5 g/dL DMSO) 0.809 dL/g. The molecular weight distribution was measured by gel permeation chromatography in DMAc: $M_n$ 50,300, $M_w$ 62,100, $M_z$ 77,600. Thermo-gravimetric analysis (10° C./min scan rate) showed an onset of decomposition at 205° C. under nitrogen. $^1$H NMR (DMSO-d$_6$) showed broad overlapping peaks for the polymer with major peaks at 7.62, 7.77, and 8.39. $^{19}$F NMR (DMSO-d$_6$): −78.15 (s), −78.08 (s).

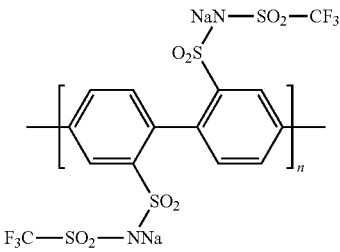

The polymer (0.8 g) was dissolved in a 1:1 mixture of water and n-propanol to give a viscous solution, which was filtered using a glass microfiber syringe filter. The solution was cast onto a piece of polyethylene sheet affixed to a glass plate and dried on a leveled drying stage inside a cool vacuum oven under nitrogen purge. The membrane lifted free of the film on its own. The membrane was sectioned for in-plane conductivity measurements as shown in Table 1.

TABLE 1

| Dimensions Thickness × Width μm × cm | Temperature °C. | Relative Humidity % | In-Plane Conductivity mS/cm |
|---|---|---|---|
| 76 × 5.97 | 80 | 95 | 414 |
|  | 80 | 50 | 42 |
| 104 × 3.75 | 120 | 95 | 387 |
|  | 120 | 50 | 58 |

Example 4

Inside a glove box, a 100 mL round-bottom flask equipped with a reflux condenser, stirring bar, and septum was charged with 2,5-dibromo-benzene-sulfonyl chloride (16.35 g, 50 mmoles), trifluoromethanesulfonamide (7.27 g, 50 mmoles), and acetonitrile (50 mL). Triethylamine (14 mL, 100 mmoles) was added slowly by syringe. The solution was heated to a reflux overnight. The solution was cooled to room temperature and poured into an aqueous solution of sodium hydroxide (4.0 g, 100 mmoles) in 100 mL water. The solvents were evaporated on a rotary evaporator and the solids were dried under vacuum. The solids were recrystallized by dissolving in dioxane at a reflux, treating with decolorizing carbon, filtering the solution, and concentrating the solution at a reflux to 130 mL to induce crystallization. The white crystals were collected by vacuum filtration, washed with dioxane, and dried under vacuum. The recrystallization was repeated to give 19.45 g (83% yield) of N-trifluoromethane-sulfonyl-2,5-dibromo-benzene-sulfonamide, sodium salt. The salt was dried overnight in a vacuum oven at 150° C. under a nitrogen purge.

Example 5

Inside a glove box, a 250 mL round-bottom flask equipped with a stirring bar, reflux condenser, and a septum was charged with N-trifluoromethanesulfonyl-2,5-dibromo-benzene-sulfonamide, sodium salt (19.45 g, 50 mmoles), activated copper powder (40 g), and DMF (80 mL). The flask was heated to 120° C. under nitrogen and stirred overnight. The solution was cooled to room temperature, filtered, and the solids washed with DMF. The solvent was evaporated by distilling under high vacuum and the resulting solids were dried under vacuum. The dark solids were dissolved in water by heating to a reflux and adding hydrochloric acid to give pH of 1. Residual dark solids were filtered off then the solution was neutralized using aqueous sodium hydroxide, which gave a yellow-brown precipitate that was removed by filtration. The mixture was saturated with sodium chloride and concentrated at reflux to 400 mL. Upon cooling, magenta solids precipitated from solution. The solids were collected by vacuum filtration and dried under vacuum to give 13.2 g (68% crude yield). The solids were dissolved in methanol at a reflux, treated with decolorizing carbon, filtered, evaporated, and dried in a vacuum oven at 150° C. under nitrogen purge. The solids were recrystallized from dioxane (50 mL) inside the glove box after filtering off residual solids. The crystals were collected and washed with dioxane to remove much of the remaining magenta color. The recrystallization was repeated inside the glove box to give colorless crystals, which were dried in a vacuum oven at 150° C. under nitrogen purge and transferred to a glove box for storage and handling to give 10.78 g (55% yield) of N,N'-bis(trifluoromethane-sulfonyl)-4,4'-dibromo-biphenyl-2,2'-disulfonamide, disodium salt. $^{19}$F NMR (DMSO-$d_6$): −78.31 (s).

Example 6

Inside the glove box, a 100 mL round-bottom flask equipped with a stirring bar and a septum was charged with bis(1,5-cyclooctadiene)nickel(0) (3.89 g, 14.14 mmoles), cyclooctadiene (1.53 g, 14.14 mmoles), 2,2'-dipyridyl (2.21 g, 14.14 mmoles), and DMF (20 mL). The flask was heated to 60° C. under nitrogen for 30 minutes to give a dark violet-colored solution. Inside the glove box, a 50 mL round-bottom flask equipped with a septum was charged with N,N'-bis(trifluoromethanesulfonyl)-4,4'-dibromo-biphenyl-2,2'-disulfonamide, disodium salt (5.45 g, 7 mmoles) and DMF (20 mL). This solution was added by cannula to the reaction flask under nitrogen and maintained at 60° C. for two days to give a black colored mixture with an increase in viscosity. The reaction mixture was poured into a 1:1 solution of hydrochloric acid and methanol to precipitate the solid polymer. The mixture was chopped in a blender to disperse the polymer into particles. The polymer was collected by vacuum filtration and aspirated until damp. The polymer was dissolved in DMF, filtered, reprecipitated using hydrochloric acid, collected by vacuum filtration, and washed with hydrochloric acid. The polymer was dried in a vacuum oven at 100° C. under nitrogen purge to give 2.44 g (61% yield) of poly(p-phenylene trifluoromethanesulfonimide). $\eta_{inh}$ (0.5 g/dL DMSO) 0.781 dL/g. The molecular weight distribution was measured by gel permeation chromatography in DMAc: $M_n$ 50,800, $M_w$ 67,400, $M_z$ 89,000.

The polymer (2 g) was dissolved in n-propanol to give a viscous solution and filtered through a glass microfiber syringe filter. The solution was cast onto several piece of polyethylene sheet affixed to a glass plates and dried on a leveled drying stage inside a nitrogen-purged drying box. The membranes lifted free on their own. The samples membranes were cut out as disks for through-plane conductivity measurements as shown in Table 2.

TABLE 2

| Dimensions Thickness × Diameter μm × mm | Temperature °C. | Relative Humidity % | Through-Plane Conductivity mS/cm |
|---|---|---|---|
| 95 × 6.35 | 80 | 95 | 138 |
|  | 80 | 50 | 39.5 |
| 114 × 6.35 | 80 | 95 | 163 |
|  | 80 | 50 | 23.9 |

Example 7

4,4'-Dibromo-biphenyl-3,3'-disulfonic acid, sodium salt and its sulfonyl chloride derivative were prepared by modification of the procedure of C. Courtot and C. C. Lin *Bull. Soc. Chim. Fr.* 1931, 49 (4), 1047.

A 1 L two-neck round-bottom flask equipped with a reflux condenser, thermocouple well, stirring bar, and gas inlet was charged with chlorosulfonic acid (61 mL, 1 mole) and chloroform (500 mL). 4,4'-dibromo-biphenyl (50 g, 0.16 mole) was added to the flask and washed in with chloroform (200 mL). The mixture was heated to 58° C. to give rapid gas evolution (hydrogen chloride), which slowed over the course of a few hours, then maintained at reflux overnight. Gas evolution had ceased the following day and the solution was cooled to room temperature. The solution was treated with water (20 mL) by dropwise addition to quench the excess chlorosulfonic acid, which led to renewed gas evolution and precipitation of a white solid. The solids were collected by vacuum filtration, washed with chloroform and water, and dried under vacuum to give 47.68 g of a crude mixture of 3,7-dibromo-dibenzothiophene-5,5-dioxide and 4,4'-dibromo-biphenyl-3,3'-disulfonyl dichloride. The combined filtrates were separated and the chloroform layer washed with water then filtered through filter aid, evaporated and dried under vacuum to give an additional 29.40 g. The combined solids were hydrolyzed with 50% sodium hydroxide (65 g) diluted to 2.5 L with water and heated to a reflux. A white solid was filtered off and washed with water then dried under vacuum to give 35.2 g (59%) of 3,7-dibromo-dibenzothiophene-5,5-dioxide. The aqueous filtrate was neutralized with concentrated hydrochloric acid followed by sodium bicarbonate and concentrated until an insoluble gel formed, which was removed by filtration through filter aid. The solution was concentrated further and saturated with sodium chloride then cooled to room temperature. The product was collected by vacuum filtration and dried in the vacuum oven to give 28.5 g (34%) of 4,4'-dibromo-biphenyl-3,3'-disulfonic acid, sodium salt. $^1$H NMR (DMSO-$d_6$): 8.02 (dd, J=8.2 and 1.8 Hz, 2H), 8.16 (d, J=8.2 Hz, 2H), 8.34 (d, J=1.8 Hz, 2H).

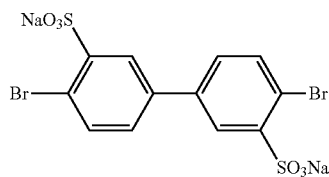

Inside a glove box, a 500 mL round-bottom flask equipped with a reflux condenser, stirring bar, and gas inlet was charged with 4,4'-dibromo-biphenyl-3,3'-disulfonic acid, sodium salt (27 g, 52 mmoles) and phosphorus pentachloride (33 g, 160 mmoles). The apparatus was transferred to the hood and chlorobenzene (200 mL) was added to the flask under nitrogen. The solution was heated to a reflux overnight. The solution was cooled to room temperature, filtered to remove the solids that formed, and poured into hexane (600 mL) to precipitate the product. The solids were collected by vacuum filtration and washed with hexanes then dried under vacuum to give 13.8 g (52%). The solids were recrystallized from chloroform and dried under vacuum to give 10.95 g (41%) of 4,4'-dibromo-biphenyl-3,3'-disulfonyl dichloride. $^1$H NMR (CDCl$_3$): 7.74 (dd, J=8.3 and 2.2 Hz, 2H), 7.98 (d, J=8.3 Hz, 2H), 8.35 (d, J=2.2 Hz, 2H).

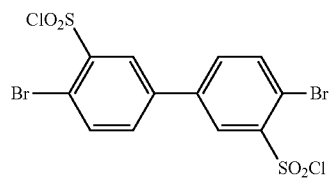

Example 8

Inside a glove box, a 250 mL round-bottom flask equipped with a stirring bar, reflux condenser, and a septum was charged with 4,4'-dibromo-biphenyl-3,3'-disulfonyl dichloride (10.95 g, 21.5 mmoles), trifluoromethanesulfonamide (6.41 g, 43 mmoles), and acetonitrile (75 mL). Triethylamine (13 mL, 93 mmoles) was added slowly by syringe. The solution was heated to a reflux and stirred overnight under nitrogen. The solution was cooled to room temperature and poured into an aqueous solution of sodium hydroxide (3.5 g, 88 mmoles) in 400 mL water. The solvents were evaporated on a rotary evaporator and the solids were dried under vacuum. The solids were dissolved in n-propanol at reflux, filtered to remove insolubles and salt, treated with decolorizing carbon, filtered to remove the carbon, evaporated on a rotary evaporator, and dried under vacuum to give 16.8 g (100%). The solids were recrystallized from n-propanol using decolorizing carbon again and collecting three crops for a combined weight of 13.75 g (82% yield). The solids were recrystallized from n-propanol as needles in two crops by allowing for slow evaporation of the solvent. The crystals were dried under vacuum to give a total of 9.61 g (57%) of N,N'-bis(trifluoromethanesulfonyl)-4,4'-dibromo-biphenyl-3,3'-disulfonamide, disodium salt. $^1$H NMR (DMSO-$d_6$): 7.69 (dd, J=8.2 and 2.4 Hz, 2H), 7.87 (d, J=8.2 Hz, 2H), 8.03 (d, J=2.4 Hz, 2H). $^{19}$F NMR (DMSO-$d_6$): −78.2 (s). The compound was redried at 150° C. overnight in a nitrogen-purged vacuum oven then transferred immediately to the glove box.

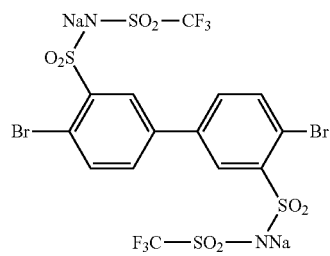

Example 9

Inside the glove box, a 5 mL round-bottom flask equipped with a stirring bar and a septum was charged with bis(1,5-cyclooctadiene)nickel(0) (1.11 g, 4.04 mmoles), cyclooctadiene (0.44 g, 4.04 mmoles), 2,2'-dipyridyl (0.63 g, 4.04 mmoles), and DMF (5 mL). The flask was heated to 60° C. under nitrogen for 30 minutes to give a dark violet-colored solution. Inside the glove box, a 50 mL round-bottom flask equipped with a septum was charged with N,N'-bis(trifluoromethanesulfonyl)-4,4'-dibromo-biphenyl-3,3'-disulfonamide, disodium salt (1.56 g, 2.00 mmoles) and DMF (10 mL). This solution was added by cannula to the reaction flask under nitrogen and maintained at 60° C. for 1 day to give a blue-black colored mixture without any noticeable change in solution viscosity. The reaction mixture was poured into a 1:1 solution of hydrochloric acid and methanol to precipitate a small amount of fine powder. The powder was collected by vacuum filtration, washed with hydrochloric acid and ether, and dried in a vacuum oven. There was only enough material for an NMR sample. The $^1$H and $^{19}$F NMR spectra were similar to previous samples of poly(p-phenylene trifluoromethanesulfonimide).

Comparative Example 1

Inside the glove box, a 100 mL round-bottom flask equipped with a stirring bar and a septum was charged with N,N'-bis(trifluoromethanesulfonyl)-4,4'-dibromo-biphenyl-3,3'-disulfonamide, disodium salt (5.00 g, 6.4 mmoles), activated copper powder (4.00 g, 63 mmoles) and NMP (50 mL). The mixture was heated to 140° C. under nitrogen and stirred for two days without any noticeable change in color or solution viscosity. The reaction solution was decanted into a 1:1 solution of hydrochloric acid and methanol without any precipitation of isolable polymer.

What is claimed is:

1. A polymer comprising repeating units of Formula (I):

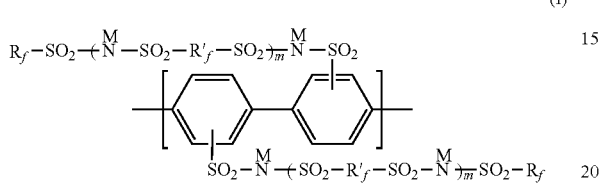
(I)

wherein $R_f$ and $R'_f$ are independently a straight chain, branched or cyclic, perfluorinated alkylene groups having from 1 to 20 carbon atoms and optionally substituted with one or more ether oxygens or halogens;
m is 0 to 6; and
M is one or more of monovalent cation.

2. The polymer of claim 1 wherein M is H, Li, Na, or K.
3. The polymer of claim 1 wherein m is 0.
4. The polymer of claim 1 wherein $R_f$ and $R'_f$ are independently a perfluorinated alkylene groups having from 1 to 10 carbon atoms.
5. The polymer of claim 4 wherein $R_f$ and $R'_f$ are independently a linear, perfluorinated alkylene groups having from 1 to 4 carbon atoms.
6. The polymer of claim 1 that is a homopolymer.
7. The polymer of claim 1 wherein Formula (I) is

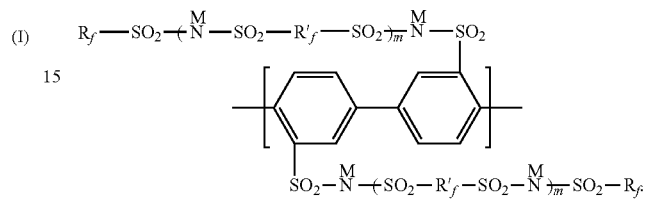

8. The polymer of claim 7 wherein m is 0.
9. A membrane comprising the polymer of claim 1.
10. An electrochemical cell comprising the polymer of claim 1.
11. The electrochemical cell of claim 10 that is a fuel cell.

* * * * *